Jan. 1, 1924 1,479,492
G. BAILHE
ACCELERATOR FOR MOTOR VEHICLES
Filed Jan. 16, 1923
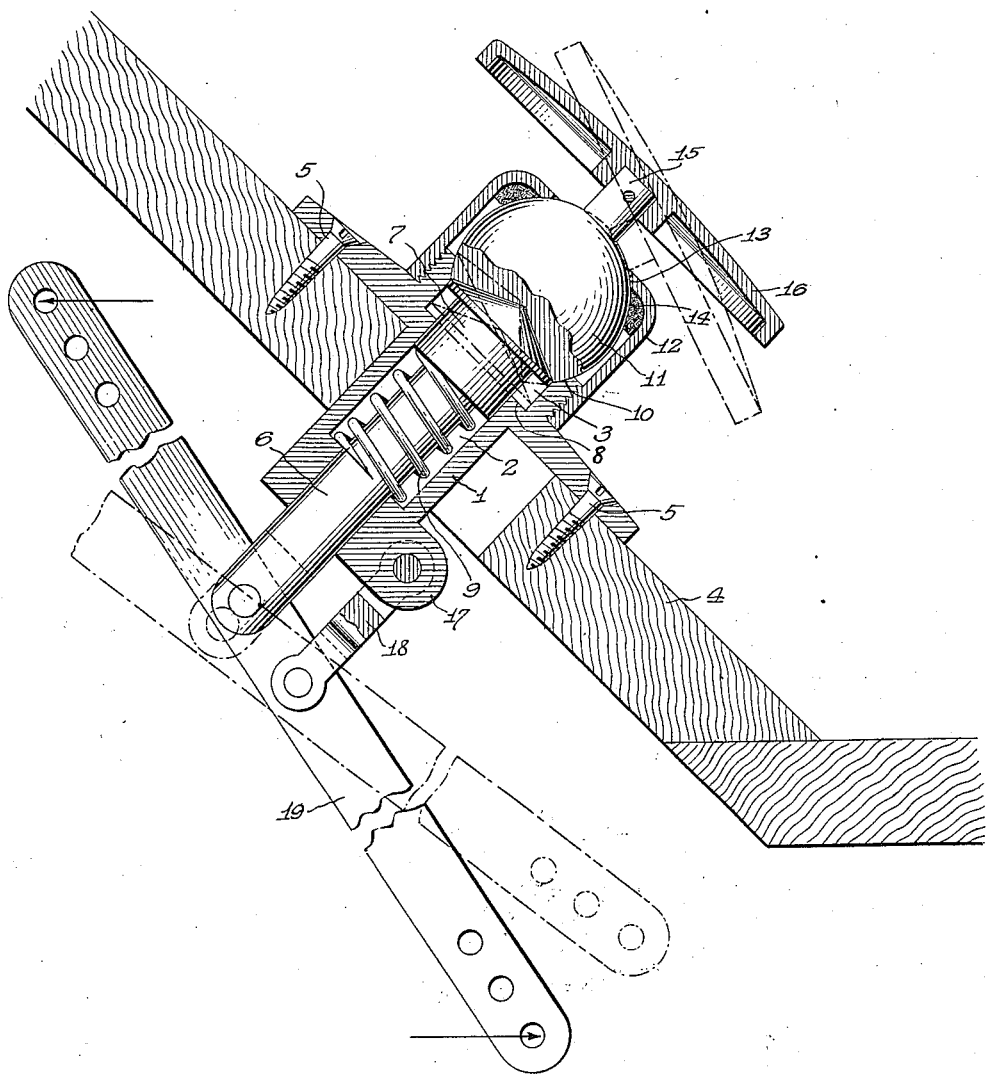
Inventor
George Bailhe
By Homer C Underwood
Attorney Patented Jan. 1, 1924.

1,479,492

UNITED STATES PATENT OFFICE.

GEORGE BAILHE, OF FORT WAYNE, INDIANA.

ACCELERATOR FOR MOTOR VEHICLES.

Application filed January 16, 1923. Serial No. 612,978.

*To all whom it may concern:*

Be it known that I, GEORGE BAILHE, a citizen of the United States of America, residing in the city of Fort Wayne, county of Allen, and State of Indiana, have invented certain new and useful Improvements in Accelerators for Motor Vehicles, of which the following is a specification.

My present invention relates more particularly to an improvement in my accelerator shown and described in my companion application, Serial No. 564,876, filed May 31, 1922, and has for its object to provide an improved foot-pedal so housed at its lower end that it will only operate the throttle when pressed or turned sidewise on some part of the periphery of the pedal and will avoid increased acceleration of the vehicle if pressure is applied in a straight line without the turning movement or side-wise pressure, and at all times operates as a rest for the foot. This construction also avoids unintended opening of the throttle by reason of bouncing of the vehicle body in passing over rough places in the road.

With the foregoing and other objects in view, I will now describe the mechanism by which these objects are attained, referring to the drawings forming a part of my specification and using reference numerals to indicate the several parts.

Fig. 1 is a vertical section of my accelerator.

In the accompanying drawing, 1 is a casing in which is formed a cylindrical recess 2, the upper portion 3 of which is of greater diameter than the lower portion 2. The casing is secured to the floor-board, 4, of the motor vehicle by screws, 5, or other suitable securing means. The lower end of the casing is apertured to receive one end of a reciprocating plunger 6, which is provided with a head 7 the upper end of which is conical and of greater diameter and adapted to be reciprocated within the upper portion 3, of the recess 2. The plunger is limited in its downward travel by the shoulders 8, at the junction of the recess 2 and the portion thereof of greater diameter, 3. Between the plunger head and the bottom of the recess 2 is a spring, 9, which forms a resilient support for the plunger. The upper end of the casing 1 is provided with a shoulder 10 on which rests a ball 11 which is held in place by a cap 12 threaded or otherwise suitably secured to the casing 1. This cap is apertured at the top to permit the ball to protrude therethrough and to form a seat 13. Between the cap and the ball is an oil packing 14, for lubricating purposes. The said ball is recessed to correspond to the conical head of the plunger and the peripheral edge of this recess is adapted to slide on the conical surface of the plunger when the ball is rotated. The ball 11 is provided with a stud 15 on which is suitably secured a foot-pedal 16, or the ball and foot-pedal might be one piece.

The lower end of said casing 1 is provided with a laterally projecting bearing 17 to which is pivoted a link 18 which provides a pivotal support for a rocker-arm 19. The rocker-arm is also pivoted to the lower end of the plunger 6 so that when the plunger is reciprocated the rocker-arm may assume the position shown in dotted lines. To either end of the rocker-arm may be secured any suitable linkage connecting it to the throttle valve of the carburetor, not shown because the making of such connections are well understood.

The operation of my accelerator will be readily understood from the foregoing description and drawings. The foot-pedal normally rests in the position shown in full lines. In this position it will be seen that the foot may rest on the pedal or pressure may be applied thereto without actuating the accelerator plunger and therefore without disturbing the throttle, because the ball 11 is at all times confined between the shoulders 10 and the seats 13, in the cap 12. If he desires to accelerate the motor, he tilts the pedal in any direction, for illustration as indicated in dotted lines, thereby causing the ball 11 to rotate and the edges of the recess therein to slide against the conical head of the plunger and depress the plunger. When the plunger is depressed the spring 9 is compressed and serves to return the plunger to its normal position when the foot is removed from the pedal, or it is turned by the operator to normal position. Thus it is seen that the rotation of the ball 11 and the action of the spring 9, produces a reciprocating action of the plunger, which, being connected at its lower end with a rocker-arm suitably connected to the throttle, will open and close the throttle. Since the throttle can only be operated by a rotating movement of the ball 11, it is apparent that vibration of the floor-board, or bouncing of the car body, or sudden pressure of the foot as if applying the break, will not disturb the throttle.

Having fully described my invention and its operation, what I claim is:

1. An accelerator for motor vehicles comprising a foot-pedal, one end of which is a recessed ball, a plunger in contact therewith and mounted upon a resilient support.

2. A foot-pedal, one end of which is a recessed ball.

3. An accelerator for motor vehicles comprising a foot-pedal, one end of which is a recessed ball, means for supporting the ball, means for maintaining the ball in contact with its support, a plunger mounted upon a resilient support and in contact with the ball.

4. An accelerator for motor vehicles comprising a foot-pedal, one end of which is a recessed ball, means for supporting the ball, means for maintaining the ball in contact with its support, a plunger mounted upon a resilient support and in contact with said ball, and means for lubricating the ball.

Signed at Fort Wayne, county of Allen, State of Indiana, this 21st day of December, 1922, in the presence of two subscribing witnesses.

GEORGE BAILHE,

Witnesses:
 CHAS. R. WEATHERHOGG,
 GERTRUDE SCHICK.